United States Patent [19]
Wright

[11] Patent Number: 5,547,308
[45] Date of Patent: Aug. 20, 1996

[54] FASTENING DEVICE

[75] Inventor: Andrew C. W. Wright, Farnham, United Kingdom

[73] Assignee: Dzus Fastener Europe Limited, Farnham, United Kingdom

[21] Appl. No.: 325,336

[22] PCT Filed: Apr. 27, 1993

[86] PCT No.: PCT/GB93/00871

§ 371 Date: Oct. 24, 1994

§ 102(e) Date: Oct. 24, 1994

[87] PCT Pub. No.: WO93/22182

PCT Pub. Date: Nov. 11, 1993

[30] Foreign Application Priority Data

Apr. 28, 1992 [GB] United Kingdom ............. 9209155

[51] Int. Cl.⁶ ....................................... F16B 2/18
[52] U.S. Cl. .................. 403/325; 403/320; 224/42.12; 224/42.24; 301/115
[58] Field of Search ................... 403/321, 322, 403/325, 315, 320, 326, 327, 328, 74; 224/42.12, 42.24, 42.25, 42.29, 42.19; 301/111, 112, 114, 115; 292/306, 251; 411/918; 248/222.1

[56] References Cited

U.S. PATENT DOCUMENTS

| | | | |
|---|---|---|---|
| 2,430,649 | 11/1947 | Schulz | 248/191 |
| 3,244,444 | 4/1966 | Bisbing | 292/306 |
| 3,363,291 | 1/1968 | Bond | 292/306 X |
| 4,007,863 | 2/1977 | Norris | 224/42.24 |
| 4,024,158 | 8/1977 | Cole | 224/42.24 X |
| 4,130,227 | 12/1978 | Rice | 224/42.24 |
| 4,169,687 | 10/1979 | Schull | 403/109 |

FOREIGN PATENT DOCUMENTS

| | | | |
|---|---|---|---|
| 2522743 | 9/1983 | France | 423/325 |
| 3201365 | 4/1983 | Germany . | |

Primary Examiner—Kenneth J. Dorner
Assistant Examiner—Harry C. Kim
Attorney, Agent, or Firm—Hoffmann & Baron

[57] ABSTRACT

A fasting device has a shaft and a clamping assembling. The clamping assembly has an outer housing shaped so as to retain the object to be clamped in position and an inner core rotatably disposed within the outer housing and in threaded engagement with a hole in one of the outer housing. A sprag is disposed within the outer housing and located in a slot in the inner core, both the inner core and the sprag plate having through holes to receive the shaft. A bias spring biases the sprag into engagement with the inner core.

6 Claims, 2 Drawing Sheets

FASTENING DEVICE

BACKGROUND OF THE INVENTION

This invention relates to a fastening device, and more particularly, to a device for fastening a spare wheel on to a vehicle.

A number of problems arise when fastening the spare wheel of a vehicle into its storage position. It is advantageous to have a fixing mechanism for the wheel which is simple to operate as well as being quickly and easily detachable. At the same time, however, the device must provide sufficient fastening strength to prevent it from working loose due to the vibrations and the shocks received during normal operation. In addition, as the thickness of the hub of the spare wheel can vary according to wheel type, it is advantageous to provide a fastening which provides adequate clamping load independent of wheel hub thickness.

SUMMARY OF THE INVENTION

According to the present invention there is provided a fastening device comprising a shaft and a clamping assembly, the clamping assembly having:

an outer housing shaped so to as retain the object to be clamped in position; an inner core rotatably disposed within the outer housing and in threaded engagement with a hole in one end of the outer housing; a sprag plate disposed within the outer housing and located in a slot in the inner core, both the inner core and the sprag plate having through holes to receive the shaft, and a bias spring for biasing the sprag plate in to engagement with the inner core, the arrangement being such that when the inner core is rotated in relation to the outer housing the sprag plate pivots between a first position normal to the shaft, in which the shaft is free to move through the hole in the sprag plate, and a second position inclined relative to the shaft, in which the shaft is gripped by the sprag plate.

The shaft may be smooth or, alternatively, may be screw-threaded or annularly ribbed.

The shaft may be of non-circular cross section, and engageable with a hole of similar cross-section through the inner core of the clamping assembly, so that, when the clamping assembly is in engagement with the shaft, rotation of the outer housing causes pivoting of the sprag plate and fastens the clamping assembly to the shaft.

The shaft may be fixed to the vehicle and the clamping assembly removable from it or, alternatively, the shaft may be fixed to the clamping assembly and spring loaded to eject when the sprag is released, the shaft having a "T" shaped end connectable with a support fixed to the vehicle so that an initial turn of the inner core locates and locks the shaft, and a further turn of the inner core engages the sprag.

DETAILED DESCRIPTION OF THE PREFERRED EMBODIMENT

Figure 1:
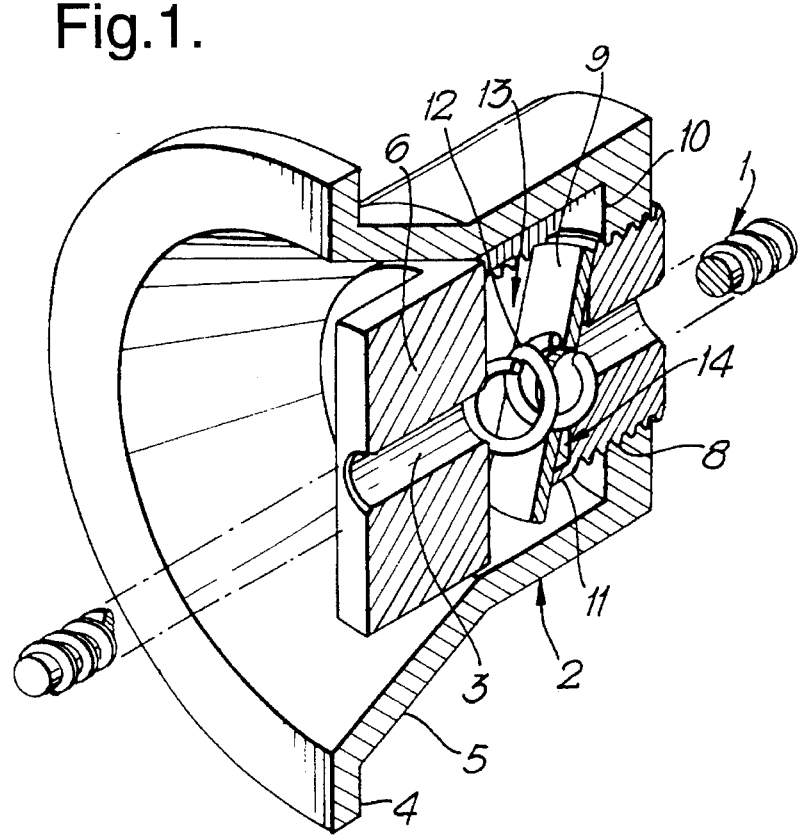
FIG. 1 is a cross-sectional perspective view of the fastening device having a threaded shaft.

One example of the present invention will now be described with reference to FIG. 1 which is a sectional view of the fixing device.

The fastening device has a right-handed screw threaded shaft 1 and a clamping assembly 2. The clamping assembly 2 has a hole 3 through its centre, large enough to allow the shaft 1 to pass through it.

The clamping assembly 2 has an outer housing 5 in threaded engagement with an inner core 6, the housing 5 and the core 6 being arranged so that the core 6 is rotatable in relation to the housing 5. Disposed within the housing 5 and located within a slot 13 in the core 6 is a sprag plate 9. The sprag plate 9 is urged into engagement with a side 14 of the slot 13 by a helical bias spring 12. On one edge of the side 14 of the slot 13 is a raised lip 11, so that the sprag plate 9 rests inclined to the axis of the hole 3.

In use a spare wheel, not shown in the drawings, is placed over the screw-threaded shaft 1. The clamping assembly 2 is then placed on to the shaft 1 with the shaft 1 passing through the hole 3. The clamping assembly 2 is then pushed toward the base of the shaft 1, so that the wheel is clamped firmly between the base of the slot and the outer rim 4 of the outer housing 5 of the clamping assembly 2. In this position, the core 6 is screwed fully onto the housing 5 and the sprag plate abuts the internal end face 10 of the housing 5.

Whilst holding the outer housing 5 (or due to it being held by friction with the wheel hub), the inner core 6 is rotated clockwise causing the inner core 6 to move away from the base of the shaft 1 due to the left-handed threaded engagement 8 of the outer housing 5 and the inner core 6. One edge of the sprag plate 9 then comes out of engagement with the inner face 10 of the outer housing 5. Continued rotation of the inner core 6 causes the sprag plate 9 to pivot further and clamp on to the shaft 1. The wheel is then held firm.

To release the wheel, the inner core 6 is rotated in the opposite direction, causing the sprag 9 to pivot and eventually release the shaft 1.

Figure 2:
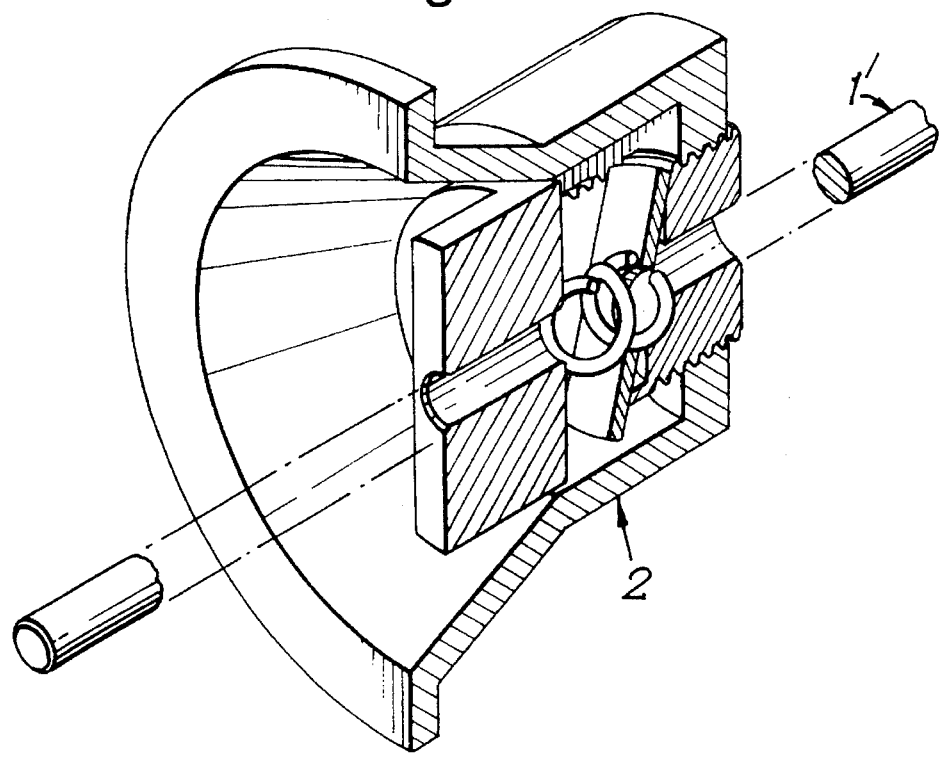
FIG. 2 is a cross-sectional perspective view of the fastening device having a smooth shaft.
Figure 3:
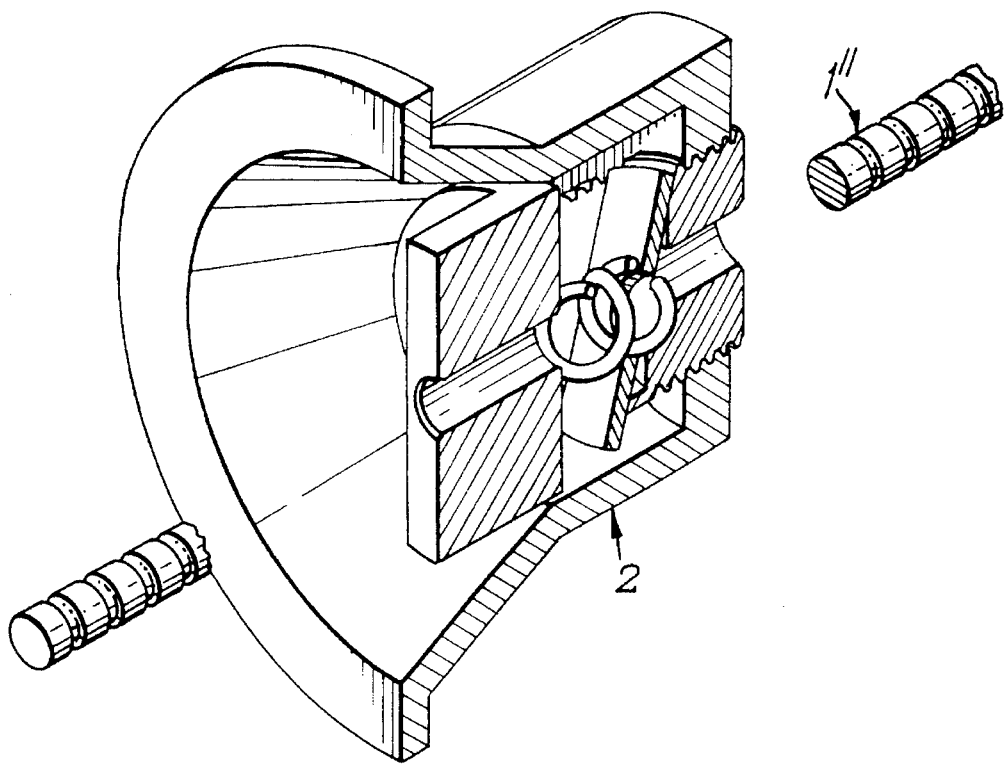
FIG. 3 is a cross-sectional perspective view of the fastening device having an annularly-ribbed shaft.
Figure 4:
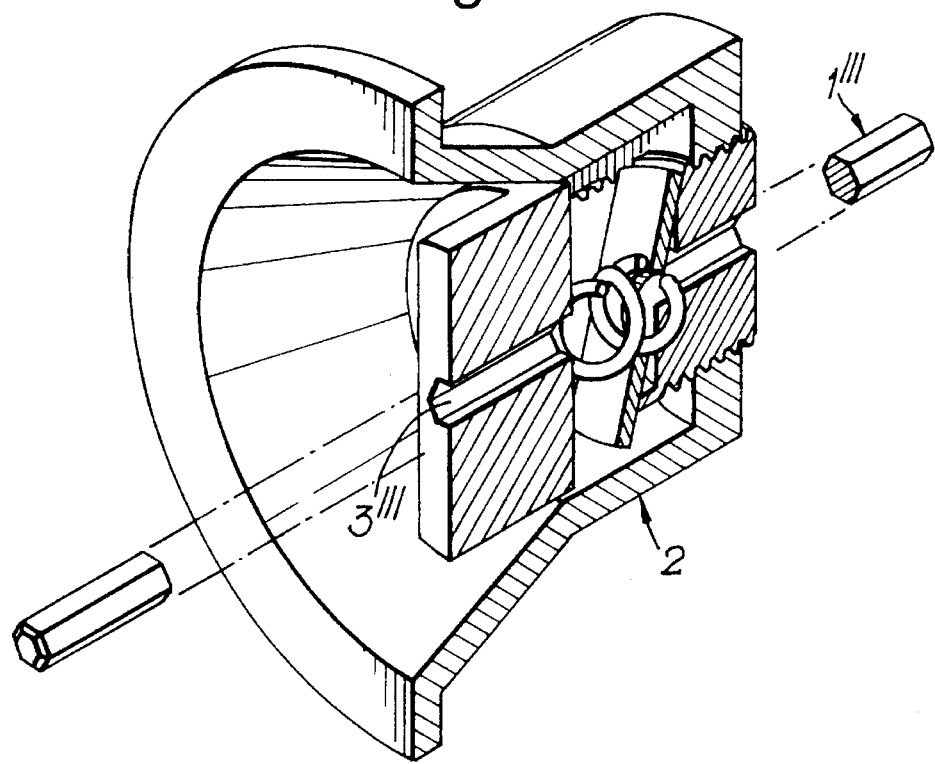
FIG. 4 is a cross-sectional perspective view of the fastening device having a non-circular shaft.

Alternative embodiments of the present invention are shown in FIGS. 2, 3 and 4. The shaft may be smooth (i.e., shaft 1' shown in FIG. 2) or annularly fibbed (shaft 1" shown in FIG. 3). As shown in FIG. 4, the shaft may also be of non-circular cross-section (i.e., shaft 1''') and engageable with a hole of similar cross-section (i.e., hole 3''') through the inner core of the clamping assembly.

What is claimed is:

1. A fastening device comprising a shaft (1) and a clamping assembly (2), the clamping assembly having:

an outer housing (5) shaped so as to retain an object to be clamped in position; an inner core (6) rotatably disposed within the outer housing and in threaded engagement with a hole in one end of the outer housing; a sprag plate (9) disposed within the outer housing and located in a slot (13) in the inner core, both the inner core and the sprag plate having through holes (3) to receive the shaft, and a bias spring (2) for biasing the sprag plate into engagement with the inner core, such that when the inner core is rotated in relation to the outer housing the sprag plate pivots between a first position normal to the shaft, in which the shaft is free to move through the hole in the sprag plate, and a second position inclined relative to the shaft, in which the shaft is gripped by the sprag plate.

2. A fastening device according to claim 1, wherein the shaft (1) is smooth.

3. A fastening device according to claim 1, wherein the shaft (1) is screw-threaded.

4. A fastening device according to claim 1, wherein the shaft (1) is annularly ribbed.

5. A fastening device according to claim 1, wherein the shaft (1) is of non-circular cross section, and is engageable with the through holes, the through holes having a similar cross-section through the inner core (6) of the clamping assembly (2), so that, when the clamping assembly is in engagement with the shaft, rotation of the outer housing (5) causes pivoting of the sprag plate (9) and fastens the clamping assembly to the shaft.

6. A fastening device according to claim 1, wherein the shaft (1) is, adapted to be fixed to a vehicle and the clamping assembly (2) removable from the shaft.

* * * * *